(12) United States Patent
Gates

(10) Patent No.: US 12,321,786 B2
(45) Date of Patent: Jun. 3, 2025

(54) REGULATION OF THROTTLING OF POLLING BASED ON PROCESSOR UTILIZATIONS

(71) Applicant: HEWLETT PACKARD ENTERPRISE DEVELOPMENT LP, Houston, TX (US)

(72) Inventor: Matthew S. Gates, Houston, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 896 days.

(21) Appl. No.: 17/449,197

(22) Filed: Sep. 28, 2021

(65) Prior Publication Data

US 2023/0094430 A1 Mar. 30, 2023

(51) Int. Cl.
G06F 9/50 (2006.01)

(52) U.S. Cl.
CPC .......... *G06F 9/5038* (2013.01); *G06F 9/5033* (2013.01); *G06F 9/5044* (2013.01)

(58) Field of Classification Search
None
See application file for complete search history.

(56) References Cited

U.S. PATENT DOCUMENTS

| | | |
|---|---|---|
| 5,596,576 A | 1/1997 | Milito |
| 5,677,909 A | 10/1997 | Heide |
| 6,151,312 A | 11/2000 | Evans et al. |
| 6,282,187 B1 | 8/2001 | Evans et al. |
| 6,697,870 B1 | 2/2004 | Cafarelli, III et al. |
| 6,735,629 B1 | 5/2004 | Cafarelli, III et al. |
| 6,877,081 B2 | 4/2005 | Herger et al. |
| 7,412,513 B2 | 8/2008 | Levanoni et al. |
| 7,571,216 B1 | 8/2009 | McRae et al. |
| 7,620,000 B2 | 11/2009 | Meier |
| 8,417,828 B2 | 4/2013 | Ma et al. |
| 8,738,860 B1 | 5/2014 | Griffin et al. |
| 8,767,772 B2 | 7/2014 | Masputra et al. |
| 9,705,733 B2 | 7/2017 | Zelek et al. |
| 10,484,201 B2 | 11/2019 | Agrawal et al. |

(Continued)

FOREIGN PATENT DOCUMENTS

CN 104320283 A 1/2015

OTHER PUBLICATIONS

SNIAVideo, Transcript of video "10 Million I/Ops From a Single Thread (SDC 2019)," Oct. 31, 2019, video available at: <www.youtube.com/watch ?v=4dgo3JRwiXw>.

(Continued)

*Primary Examiner* — Eric C Wai
(74) *Attorney, Agent, or Firm* — Trop, Pruner & Hu, P.C.

(57) ABSTRACT

A process includes determining a first degree of throttling to apply to a polling of hardware devices by a hardware processor based on a historical total utilization of the hardware processor; and determining a second degree of throttling to apply to the polling of hardware devices by the hardware processor based on a historical polling utilization of the hardware processor. The hardware processor includes, responsive to an upcoming hardware device polling cycle for the hardware processor and based on the first degree of throttling and the second degree of throttling, regulating whether the hardware processor bypasses the hardware device polling cycle or executes the hardware device polling cycle.

20 Claims, 11 Drawing Sheets

(56) References Cited

U.S. PATENT DOCUMENTS

| | | | |
|---|---|---|---|
| 10,558,574 B2 | 2/2020 | Khade et al. | |
| 2002/0080816 A1* | 6/2002 | Spinar | H04W 28/20 |
| | | | 370/468 |
| 2004/0153537 A1* | 8/2004 | Rezvani | H04L 67/10 |
| | | | 709/223 |
| 2007/0038744 A1* | 2/2007 | Cocks | H04L 43/024 |
| | | | 709/224 |
| 2012/0109852 A1 | 5/2012 | Lingam et al. | |
| 2012/0290805 A1 | 11/2012 | Bish et al. | |
| 2013/0024875 A1 | 1/2013 | Wang et al. | |
| 2020/0218676 A1 | 7/2020 | Cao et al. | |
| 2020/0228451 A1 | 7/2020 | Luo | |
| 2020/0241927 A1 | 7/2020 | Yang et al. | |
| 2022/0066831 A1 | 3/2022 | Gates et al. | |

OTHER PUBLICATIONS

Ben Walker, "10 Million I/Ops From a Single Thread," Presentation slides, SDC 2019, Sep. 23-26, 2019, 12 pages.

Walker et al., "10.39M Storage I/O Per Second From One Thread", available online at <spdk.io/news/2019/05/06/nvme/>, May 6, 2019, 15 pages.

* cited by examiner

REMAINDER OF EPOCH_ID /$2^N$ $2^N$ (FOR N=0,1,2,3 AND 4) — 508

| EPOCH_ID | 1 | 2 | 4 | 8 | 16 |
|---|---|---|---|---|---|
| 1 | 0 | 1 | 1 | 1 | 1 |
| 2 | 0 | 0 | 2 | 2 | 2 |
| 3 | 0 | 1 | 3 | 3 | 3 |
| 4 | 0 | 0 | 0 | 4 | 4 |
| 5 | 0 | 1 | 1 | 5 | 5 |
| 6 | 0 | 0 | 2 | 6 | 6 |
| 7 | 0 | 1 | 3 | 7 | 7 |
| 8 | 0 | 0 | 0 | 0 | 8 |
| 9 | 0 | 1 | 1 | 1 | 9 |
| 10 | 0 | 0 | 2 | 2 | 10 |
| 11 | 0 | 1 | 3 | 3 | 11 |
| 12 | 0 | 0 | 0 | 4 | 12 |
| 13 | 0 | 1 | 1 | 5 | 13 |
| 14 | 0 | 0 | 2 | 6 | 14 |
| 15 | 0 | 1 | 3 | 7 | 15 |
| 16 | 0 | 0 | 0 | 0 | 0 |
| 17 | 0 | 1 | 1 | 1 | 1 |
| 18 | 0 | 0 | 2 | 2 | 2 |

FIG. 5

REGULATION OF THROTTLING OF POLLING BASED ON PROCESSOR UTILIZATIONS

BACKGROUND

Storage applications on a computer platform may access hardware devices (e.g., storage devices, host bus adapters, storage nodes, and so forth) using tools and libraries of a user mode-based storage stack (e.g., a stack containing a Storage Performance Development Kit (SPDK) stack or another user mode-based storage stack). Unlike legacy storage stacks that rely on operating system kernel mode drivers, a user mode-based storage stack has user mode drivers, which avoids certain kernel mode overhead (e.g., context switching, system calls, locks, interrupt handling, and so forth). A consequence of a user mode-based storage stack is that instead of relying on interrupts from the hardware devices to indicate the availability of work, the hardware devices are interrogated, or polled, to determine whether or not the hardware devices have work. The work for a particular hardware device may be data that was requested via a prior read request, a pending direct memory access (DMA) transfer, a message to be communicated, an acknowledgement that data was stored in accordance with a prior write request, and so forth.

BRIEF DESCRIPTION OF THE DRAWINGS

FIG. 5 is a table of condition values illustrating the selection of next memory rings by a current memory ring preparation sub-process of FIG. 4 according to an example implementation.

DETAILED DESCRIPTION

Figure 1:
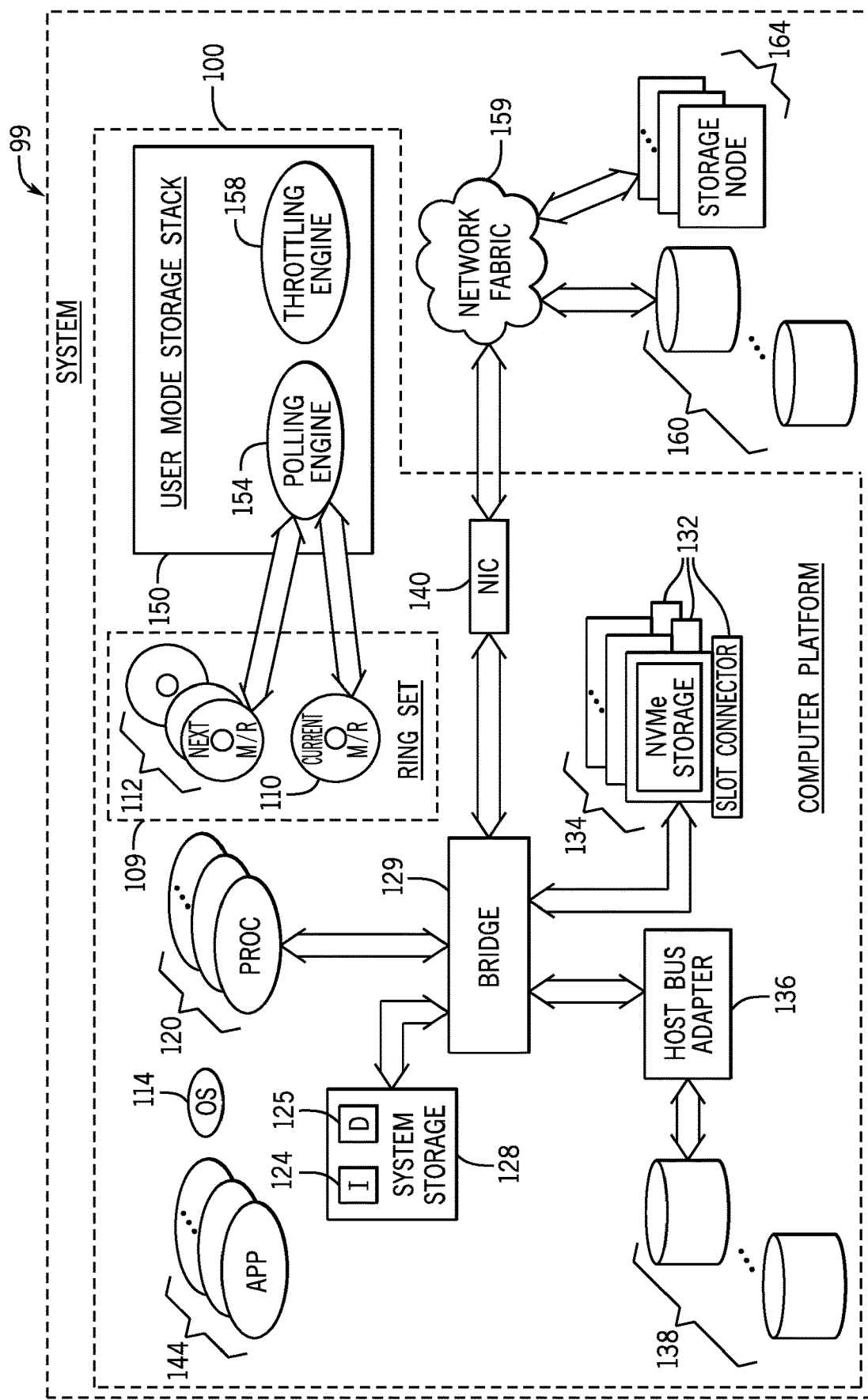
FIG. 1 is a schematic diagram of a computer system having a computer platform that polls hardware devices using a set of delay order-associated hardware device identification memory rings and throttles the polling based on a throttling percentage that is derived from processing core utilization measurements, according to an example implementation.

A user mode-based storage stack may have an associated polling load that has a strong correlation to the number of hardware devices that are being polled. In general, scaling up, or increasing, the number of hardware devices (e.g., adding more disk shelves, adding more host connections, and so forth) to the storage system increases the polling load. Because polling of hardware devices to determine work availability may consume more processing cycles than interrupt-based handling of work availability, efficiently scheduling polling may become more challenging as the number of hardware devices scales up. The overall goal of the polling scheduling is to efficiently find work among hardware devices of a storage system in a way that scales up without significantly adversely impacting storage performance metrics (e.g., input/output (I/O) throughput, completion latency time, and so forth).

In general, the hardware devices of a storage system may include backend and frontend hardware devices, such as, local storage devices, including, as examples, local storage devices (e.g., Non-Volatile Memory express (NVMe) storage disks, attached locally via Peripheral Component Interconnect express (PCIe) connectors); network-accessible storage devices (e.g., NVMe storage disks accessed over a network using an NVMe Over Fabric (NVMeOF) protocol); host bus adapters (e.g., Fibre Channel adapters, internet Small Computer Systems Interface (iSCSI) adapters, and so forth); storage nodes (e.g., storage nodes that perform direct memory access (DMA) transfers and/or messaging for a cluster); and so forth.

As used herein, "polling" a hardware device refers to a polling initiator (e.g., a hardware processing core) interrogating the hardware device (e.g., reading a designated memory location or register) to sample a state, or status, of the hardware device. In accordance with example implementations, polling a hardware device interrogates the hardware device to determine whether or not the hardware device has work to be performed by one or multiple processing cores. The hardware device "having work" refers to pending work being associated with the hardware device, which may be processed by processing cores of the computer system. More specifically, in accordance with example implementations, the polling of a particular hardware device may reveal that the hardware device has no work; the hardware device has data to be transferred (e.g., data resulting from a read request); the hardware device has an acknowledgement of the commitment of data to the storage (e.g., an acknowledgement responsive to a prior write request); the hardware device has requested to initiate a direct memory access (DMA) transfer; the hardware device has a message; and so forth.

Processing cores (e.g., central processing unit (CPU) processing cores) of a computer platform (e.g., a server blade or other platform) may execute instructions to perform work and polling cycles. One approach to managing a computer platform's polling overhead is to designate some processing cores for polling and other processing cores for performing other non-polling work (e.g., execution of jobs for applications). However, such an approach may have associated performance challenges, as it may be difficult to predict or adjust to changes in work activity of the polled hardware devices.

Another approach to regulate polling may be to use a fixed throttling percentage for a given processing core. Here the "throttling percentage" refers to a percentage, or share, of polling cycles for the processing core to bypass. For example, a throttling percentage of 75 percent means that the processing core bypasses 75 percent of polling cycles. More specifically, the processing core, may, for example, execute a batch (e.g., eight jobs) and then decide based on its throttling percentage, whether to execute an otherwise scheduled polling cycle before executing another batch of jobs. Fixing the processing core's throttling percentage, however, may not take into account considerations of the processing core's work load (i.e., polling work load and total work load), which may vary over time.

In accordance with example implementations that are described herein, a processing core determines its throttling percentage based on a measurement of an overall busy time of the processing core and a measurement of the time that the processing core spends polling during its overall busy time. Moreover, in accordance with example implementations, these measurements may be sliding time window-based measurements (i.e., moving averages), which allows the processing core to adjust its throttling percentage to account for changes in the processing core's job-related and polling-related workloads. As such, in accordance with example implementations, the throttling percentage is self-tuning, which adapts to workload changes and changes in the number of hardware devices.

In accordance with example implementations that are described herein, a set of hardware processing cores (e.g., a set of processing cores of a particular NUMA node) schedule polling by sharing a set of hardware device identification buffers. More specifically, the buffers store data, which represents hardware device identifications (IDs) of hardware devices to be polled by the processing cores. In accordance with example implementations, the set of buffers may be a set of memory rings, although a data structure other than a memory ring (to which the processing cores may share access) may be used for the buffer, such as a first-in-first-out (FIFO) buffer, in accordance with further implementations.

The set of memory rings, in accordance with example implementations, includes a "current" memory ring that has entries, or slots, that store data representing IDs of hardware devices, which are scheduled to be polled within a current unit of time called a current "epoch" herein. During a current epoch, the hardware processing cores execute batches of jobs and also performing polling cycles that are directed to the hardware devices whose IDs are stored in the current memory ring.

A hardware processing core polls a hardware device in a process called a "polling cycle" herein. To perform the polling cycle, the hardware processing core accesses a slot of the current memory ring (which is pointed to by a consumer index, or pointer, of the current memory ring); removes, or dequeues, the hardware device ID (i.e., reads the data from the access slot, which represents the hardware device ID); and polls the hardware device corresponding to the retrieved hardware device ID.

In accordance with example implementations, the current epoch begins when the current memory ring is full, i.e., at the beginning of the current epoch, each slot, or entry, of the current memory ring stores data representing a different hardware device ID to be polled in the current epoch. Eventually, after the processing cores dequeue all of the hardware device IDs from the current memory ring, the memory ring is empty, and the current epoch ends. A hardware processing core then prepares the current memory ring for the next epoch by adding, or enqueueing, data onto the current memory ring representing the hardware device IDs of hardware devices to be polled in the next epoch.

In addition to the current memory ring, the scheduling of polling involves the use of multiple "next" memory rings. As described herein, in accordance with example implementations, to prepare the current memory ring for the next epoch (responsive to the current memory ring being empty), a hardware processing core selects a set (e.g., one, two, all, and so forth) of the next memory rings according to a selection criterion (described herein); dequeues hardware device IDs from the selected set of next memory rings; and enqueues these hardware device IDs onto the current memory ring.

More specifically, in accordance with example implementations, the next memory rings are ordered and have entries, or slots, which store data representing hardware device IDs. Due to the ordering, the hardware device IDs that are stored in a particular next memory ring have the same order as this next memory ring. In accordance with example implementations, the "order," called a "delay order" herein, corresponds to how often (in terms of epochs) the hardware device IDs having the delay order are polled (i.e., how often the hardware device IDs are enqueued onto the current memory ring).

For example, in accordance with some implementations, the next memory rings may include five memory rings that are each associated with a different delay order of 0, 1, 2, 3 or 4; and the hardware device IDs that are stored in one of these next memory rings have the same delay order as the next memory ring and are polled every $2^{DELAY\ ORDER}$ (i.e., 2 to the power of the delay order value) epochs. Therefore, hardware devices having hardware device IDs that are stored in a next memory ring that is associated with the delay order of "0" are polled every epoch (i.e., every 1 ($2^0$) epoch); hardware devices that are stored in a next memory ring that is associated with a delay order of "1" are polled every other epoch (i.e., every 2 ($2^1$) epochs); hardware devices having hardware device IDs that are stored in a next memory ring that is associated with a delay order of "2" are polled every fourth epoch (i.e., every 4 ($2^2$) epochs); and so forth.

After a hardware processing core dequeues a hardware device ID from the current memory ring and polls the corresponding hardware device, the hardware processing core, in accordance with example implementations, selects a next memory ring for storing the hardware device ID based on the most recent polling results for the hardware device. More specifically, in accordance with example implementations, after a hardware processing core polls a hardware device, the hardware processing core determines a delay order for the hardware device (which may or may not be the same as the previous delay order for the hardware device ID), based on the result of the polling (i.e., whether or not the hardware device has work to be processed), as described below. The hardware processing core then stores data representing the hardware device ID in the next memory ring that is associated with the determined delay order, thereby controlling the future frequency (in terms of epochs) at which the hardware device is polled. In accordance with example implementations, the hardware processing core determines the delay orders for the hardware devices based on whether or not work was found for the hardware devices; and accordingly, the polling scheduling causes hardware devices that consistently have work to be polled more frequently and hardware devices that consistently have no work to be polled less frequently.

In accordance with example implementations, the number of entries of the current memory ring is variable, as the number of entries vary from one epoch to the next, depending on the number of hardware device IDs that are polled in each epoch. Moreover, due to the variations in the number of entries of the current memory ring from one epoch to the next, the time durations of the individual epochs also vary. Due to the self-tuning natures of the memory ring sizes and current epoch duration, the polling scheduling that is described herein scales well with the number of hardware devices of the storage system.

Referring to FIG. 1, as a more specific example, in accordance with some implementations, a computer system 99 may include one or multiple computer platforms 100. As an example, in accordance with some implementations, the computer system 99 may be a cluster of computer platforms 100, where each computer platform 100 includes hardware and software to provide a set of compute nodes for the cluster. A storage array is an example of the computer platform 100, in accordance with an example implementation. The computer platform 100 may, however, be a platform other than a storage array, in accordance with further implementations, such as a rack-mounted server or other rack-mounted appliance, a client, a desktop, a smartphone, a laptop computer, a tablet computer, and so forth. Moreover, the computer system 99 may not be a cluster-based system, in accordance with further implementations.

For example implementations in which the computer platform 100 is a storage array, the storage array may have a frame, or chassis; one or multiple motherboards may be mounted to the chassis; and each motherboard may contain one or multiple controllers comprising single or multicore central processing unit (CPU) semiconductor packages (or "sockets" or "chips"). In some examples, the storage array may have a form factor, a mechanical latch(es) and corresponding electrical connectors for purposes of allowing the storage array to be installed in and removed from a slot, in a rack-mounted blade enclosure.

Regardless of its particular form, the computer platform 100 includes hardware processors, or hardware processing cores 120 (e.g., central processing unit (CPU) cores, graphics processing unit (GPU) cores, and so forth). In addition to the processing cores 120, the computer platform 100 may include other hardware, such as, for example, a system storage 128, a bus infrastructure; one or multiple network interface controllers (NICs) 140; I/O devices, and so forth.

In accordance with example implementations, the processing cores 120 may execute machine-executable instructions 124 (or "software"), stored on at least one machine-readable storage medium, for the computer platform 100. For example, the processing cores 120 may execute instructions 124 that are associated with one or multiple applications 144 (e.g., storage applications and possibly other applications), and instructions 124 associated with a user mode-based storage stack 150.

In this context, a "user mode-based storage stack" generally refers to a storage layer, or interface, which provides a user mode storage solution (e.g., user mode libraries, tools, drivers, and so forth) for one or multiple applications 144 for purposes of allowing the applications 144 to access hardware devices of a storage system. Here, "user mode" refers to the user mode of an operating system 114, as opposed to a kernel mode of the operating system 114. In general, due to the use of the user mode-based storage stack, the processing cores 120 poll the hardware devices of the storage system for purposes of determining whether or not the hardware devices have work to be performed by the processing cores 120.

As described further herein, for purposes of polling hardware devices of the storage system, the processing cores 120 may be divided into groups, with each group of processing cores 120 using an associated memory ring set 109 (one example memory ring set 109 being depicted in FIG. 1) to schedule the polling of an associated set of hardware device of the storage system. In accordance with example implementations, the memory ring set 109 includes a current memory ring 110 and multiple next memory rings 112.

In accordance with some implementations, the computer platform 100 may contain multiple NUMA nodes, and each NUMA node may contain multiple processing cores 120. Each NUMA node may contain multiple groups of processing cores 120, and each group of processing cores 120, within a NUMA node, may use an associated memory ring set 109 to control the polling of a corresponding set of hardware devices of the storage system. In accordance with example implementations, a NUMA node corresponds to a single operating system instance.

In accordance with example implementations, the processing cores 120 may execute instructions 124 to perform batches of jobs for the applications 144 and to perform polling cycles to poll hardware devices. For purposes of performing a given polling cycle, a given processing core 120 executes instructions 124 to form a polling engine 154, and the polling engine 154 performs a process to interact with the memory ring set 109, such as example process 400 that is described below in connection with FIG. 4. Although FIG. 1 depicts a single polling engine 154, at any particular time, the computer platform 100 may have multiple active polling engines 154 that are associated with multiple processing cores 120.

In accordance with example implementations, the system storage 128 and other storage that is discussed herein each comprise at least one non-transitory machine-readable storage medium that may be formed, in general, from storage device(s), such as semiconductor storage device(s), magnetic storage device(s), phase change memory device(s), a combination of devices of one or more of these storage technologies, or the like. The system storage 128 may represent a collection of both volatile memory devices and non-volatile memory devices. In addition to the instructions 124, the system storage 128 stores data 125, which represents data associated with different data categories, or types, such as preliminary, intermediate and final result data associated with the execution of the instructions 124; data structures, such as one or multiple memory ring sets 109; and so forth.

In accordance with example implementations, a given processing core 120 may, in general, interleave job cycles with polling cycles. In a particular job cycle, the processing core 120 may execute a batch (e.g., eight) of jobs for an application 144, where a "job" refers to a unit of work that is performed by the processing core 120. After performing a batch of jobs in the corresponding job cycle, the processing core 120 may then determine whether to execute a polling cycle before returning to executing another batch of jobs in another job cycle.

The processing core 120 may, in accordance with example implementations, determine whether or not to bypass a particular polling cycle based on a polling cycle throttling percentage (herein called a "throttling percentage"). In this context, a "throttling percentage" refers to a percentage, or share, of polling cycles for the processing core 120 to skip, or bypass. Therefore, for example, a throttling percentage of 90 percent means that the processing core 120 bypasses otherwise scheduled polling cycles 90 percent of the time, whereas a throttling percentage of 20 percent means that the processing core 120 bypasses otherwise scheduled polling cycles 20 percent of the time.

A given processing core 120 may, in accordance with example implementations, execute instructions 124 as an instance of a throttling engine 158 that performs a process to determine, based on a measured total utilization of the given processing core 120 and a measured polling utilization of the given processing core 120, a percentage, or share, of polling cycles for the given processing core 120 to skip, or bypass, such as example process 700 that is described below in connection with FIGS. 7A and 7B. Although FIG. 1 depicts a single throttling engine 158, at any particular time, the computer platform 100 may have multiple active throttling engines 158 that are associated with multiple processing cores 120.

The "storage system" referred to herein includes hardware devices that are accessible through the storage stack 150 and perform operations related to the storing and retrieval of data. The hardware devices may include mass storage devices, as well as other devices related to the retrieval and storage of data in the mass storage devices. The "hardware devices" refer to components of the storage system that are capable of being polled and in response to being polled, provide an indication (e.g., data stored in a memory or register of the hardware device) of whether or not the hardware device has work. The hardware device may be a component of the computer platform 100 or may be a component that is external to the computer platform 100.

As an example, the hardware devices may include one or multiple NVMe storage devices 134 that may be installed in slot connectors 132 (e.g., PCIe connectors) of the computer platform 100. As another example, the hardware devices may include storage devices 160 (e.g., NVMe storage devices) that are accessed over network fabric 159 using, for example, an NVMeOF protocol. As another example, the hardware devices may include a host bus adapter 136 of the computer platform 100, which controls communication with storage devices 138 (e.g., SCSI devices, Fibre Channel devices, and so froth). As another example, the hardware devices may include network-accessible (via the network fabric 159) storage nodes 164.

The processing cores 120 may access the storage drives 160 and storage nodes 164, as well as other hardware devices, by communicating with the network fabric 159 via one or multiple NICs 140. In general, the network fabric 159 may be associated with one or multiple types of private and/or public communication networks, such as (as examples) Fibre Channel networks, Gen-Z fabrics, dedicated management networks, local area networks (LANs), wide area networks (WANs), global networks (e.g., the Internet), wireless networks, or any combination thereof.

In accordance with example implementations, the bus infrastructure of the computer platform 100 may include one or multiple bridges 129 that may be coupled to the system storage 128; one or multiple expansion buses (e.g., PCIe buses); and so forth. In general, the bridge(s) 129 may include interfaces to various buses of the computer platform 100, such as a PCIe bus, a Serial Peripheral Interconnect (SPI) bus, an enhanced SPI (eSPI) bus, a Low Pin Count (LPC) bus, an Inter-Integrated ($I^2C$) bus, an Improved Inter-Integrated ($I^3C$) bus, as well as possibly one or multiple buses associated with other bus standards.

In accordance with some implementations, the bridge(s) 129 may include a north bridge 129 and a separate south bridge 129. In this manner, in accordance with some implementations, the processing core 120 may include one or multiple semiconductor packages (or "chips"), and the processing core 120 may include the north bridge 129 that includes a memory controller and PCIe root ports. The south bridge 129 that may provide I/O ports, such as, for example, Serial Advanced Technology Attachment (SATA) ports, Universal Serial Bus (USB) ports, LPC ports, SPI ports, eSPI ports and so forth. In accordance with some implementations, the north bridge 129 may not be part of the processing core 120. In accordance with further implementations, the north and south bridges may be combined into a single bridge 129; and in accordance with some implementations, this single bridge 129 may be part of a multi-core central processing unit (CPU) semiconductor package (or "chip"), which contains multiple processing cores 120.

A group of processing cores 120 (e.g., a subset of a larger set of processing cores 120 of a particular NUMA node) may use the memory ring set 109 to schedule the polling of a set of hardware devices of the storage system. The processing cores 120 of the group may exclude from the polling any hardware devices that are known by the processing cores 120 to be idle. In such examples, a processing core 120 may determine that a particular hardware device is idle based on the absence of scheduled work (e.g., no pending reads or writes) for the hardware device.

The processing cores 120 may, however, be unable to determine whether some hardware devices are idle, as some hardware devices may initiate work without being requested to do so by the processing cores 120. For example, a storage node 164 may initiate the transfer of data or initiate the sending of a message, and therefore, the processing cores 120 may be unable to assess at any particular time whether or not the storage node 164 is idle. Therefore, in accordance with some implementations, the processing cores 120 consider some hardware devices to always be active. This assessment may, for example, be based on the particular type, or category, of the hardware device. In accordance with example implementations, the hardware devices that have their corresponding hardware device IDs stored in the memory ring set 109 are active devices. In this context, in accordance with example implementations, a hardware device "ID" for a given hardware device refers to an identifier (e.g., a numeric sequence, alphanumeric sequence, and so forth) that may be used to sufficiently identify, or distinguish, the given hardware device from any of the other hardware devices of the storage system.

In accordance with example implementations, the processing cores 120 assign values called "delay orders" to the hardware devices. In general, a "delay order" refers to a value that represents how often an associated hardware device is to be polled and generally corresponds to the relative level of activity of the hardware device (from a work perspective), as compared to other hardware devices. In accordance with example implementations, the delay order is an integer within a range of integer delay orders. The smallest integer value of the range corresponds to a hardware device that is deemed to have work more often (and therefore is polled relatively more often), and the highest integer value of the range corresponds to a hardware device that is deemed to provide less often (and therefore is polled relatively less often).

As an example, in accordance with some implementations, five delay orders are used: 0, 1, 2, 3 and 4. A lower delay order corresponds to a higher polling frequency, and vice versa. Therefore, the delay order of "0" corresponds to the highest polling frequency, and the delay order of "4" corresponds to the lowest polling frequency. In accordance with example implementations, a hardware device's delay order increases after several successive polling attempts have been made to the device, with all of these polling attempts revealing that the hardware device does not have any work pending. Conversely, in accordance with example implementations, a hardware device's delay order decreases in response to a polling device revealing that the hardware device has work pending.

In accordance with example implementations, the shared memory rings 110 and 112 are data structures that allow for lock-free enqueuing and dequeuing of one or multiple data corresponding to hardware device IDs to/from the data structures by multiple processing cores 120. In accordance with example implementations, the polling by the processing cores 120 (which are associated with a particular memory ring set 109) occurs in variable units of scheduling time called "epochs." In general, an "epoch" refers to a time duration in which the processing cores 120 poll hardware devices that have their associated hardware device IDs stored in the current memory ring 110. During a given epoch, the processing cores 120 dequeue hardware device IDs from the current memory ring 110 and poll the corresponding hardware devices until all entries of the current memory ring 110 have been removed, or dequeued (at which time the epoch ends). As described further herein, when all entries of the current memory ring 110 have been dequeued (i.e., when the current memory ring 110 is empty and the current epoch has ended), hardware device IDs from one or multiple next memory rings 112 are added to, or enqueued, onto the current memory ring 110 for the next epoch.

Figure 2:
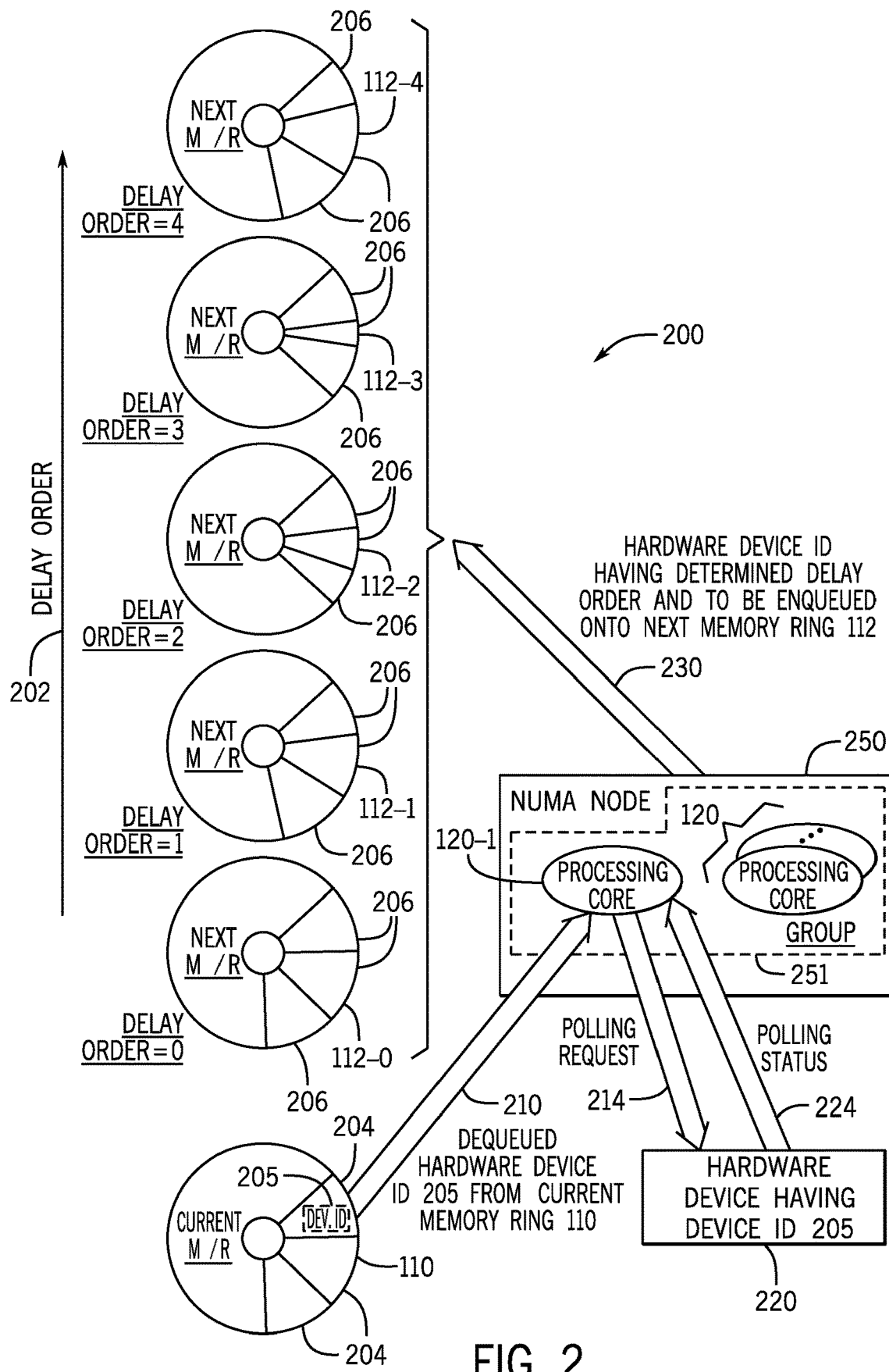
FIG. 2 is an illustration of a processing core using an associated memory ring set to poll a hardware device according to an example implementation.

FIG. 2 is an illustration 200 of the use of the current memory ring 110 and the next memory rings 112 by a particular processing core 120-1 in association with a particular polling cycle. Referring to FIG. 2 in conjunction with FIG. 1, the processing core 120-1 may be one of a group 251 of processing cores 120, such as, for example, a subset of processing cores 120 of a particular NUMA node 250. The current memory ring 110 has entries 204, where each entry 204 stores data representing a particular hardware device ID, such as example hardware device ID 205 that corresponds to depicted hardware storage device 220. As depicted in the illustration 200, the processing core 120-1 dequeues (as depicted at reference numeral 210) the hardware device ID 205 from the current memory ring 110. In this context, "dequeuing," or "removing," a hardware device ID from a memory ring refers to the retrieval of data representing the hardware device ID from a particular entry, or slot, of the memory ring and performing any associated update to the memory ring (e.g., advancing a pointer, etc.).

The processing core 120-1 submits a polling request 214 to the hardware device 220 having the retrieved hardware device ID 205, and the polling request 214 returns a polling status 224. For example, the processing core 120-1 may read data from a particular memory address or register address of the hardware device, and this read data may indicate the polling status 224, i.e., whether or not the hardware device 220 has work to be processed. Based on the polling status 224 and past history for the hardware device 220, the processing core 120-1 may then, in accordance with example implementations, adjust a delay order value associated with the hardware device 220. For example, after a certain number of consecutive responses from the hardware device 220 indicating that there is no work pending, the processing core 120-1 may increase the delay order associated with the hardware device 220; and if the hardware device 220 has work pending, then the processing core 120-1 may, for example, adjust the delay order associated with the hardware device 220 to the lowest value (e.g., a delay order value of "0"). It is noted that, in accordance with example implementations, the polling result for a particular polling cycle may not change the delay order associated with the hardware device 220.

After determining the delay order for the hardware device 220, the processing core 120-1 enqueues (as depicted at reference numeral 230) the hardware device ID 205 for hardware device 220 onto the next memory ring 112 associated with the determined delay order among the plurality of next memory rings 112. In this context, "enqueueing," or "adding," the hardware device ID onto a memory ring refers to adding data representing the hardware device ID to a corresponding entry, or slot, of the memory ring and performing any associated update to the memory ring (e.g., advancing a pointer, etc.).

As depicted at reference numeral 202, each of the next memory rings 112 may have different associated delay order values. For example, the next memory ring 112-0 may have the lowest delay order value, the next memory ring 112-1 may have the next lowest delay order value, and so forth. As a more specific example, the next memory rings 112-0, 112-1, 112-2, 112-3 and 112-4 may have the delay orders of 0, 1, 2, 3, and 4, respectively. Moreover, the hardware devices that have hardware device IDs that are stored in a particular next memory ring 112 are polled every $2^{DELAY\ ORDER}$ epoch(s) (i.e., a number of epochs equal to 2 to the power of the delay order value), where "DELAY ORDER" represents the delay order associated with the next memory ring 112. Therefore, hardware devices that have their hardware device IDs stored in the lowest delay order associated next memory ring 112-0 are scheduled to be polled in every epoch ($2^0$); hardware devices having hardware device IDs stored in the next lowest delay order associated next memory ring 112-1 are scheduled to be polled every other epoch ($2^1$); hardware devices having hardware device IDs stored in the next memory ring 112-2 are scheduled to be polled every fourth epoch ($2^2$); and so forth.

Figure 3:
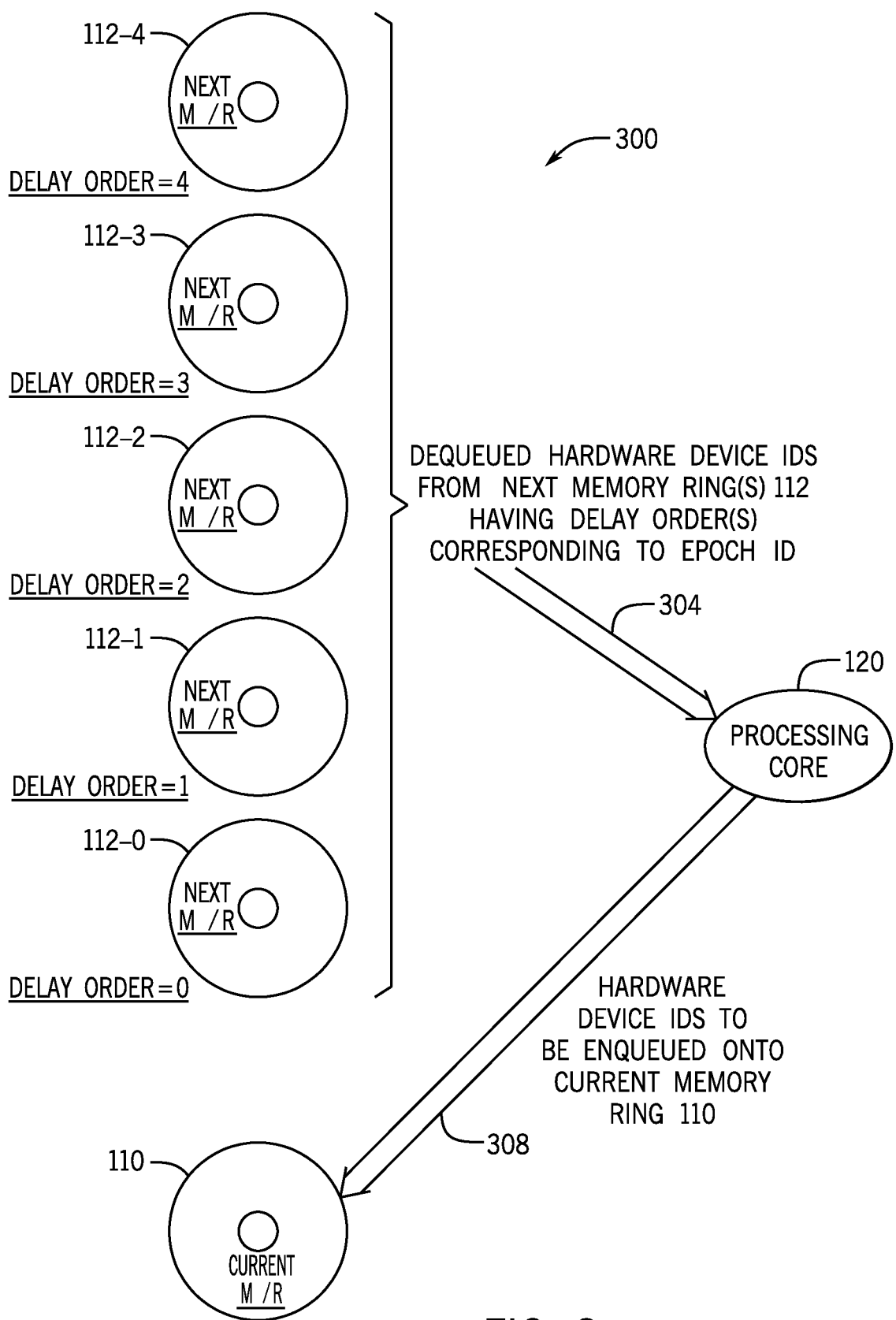
FIG. 3 is an illustration of a processing core preparing a current memory ring of the memory ring set for an upcoming epoch according to an example implementation.

FIG. 3 depicts a process 300 to prepare the current memory ring 110 for the next epoch, in accordance with example implementations. In accordance with example implementations, the process 300 is performed in response to one of the processing cores 120 (associated with the memory ring set 109) detecting a condition that corresponds to the end of the current epoch. In accordance with example implementations, the condition is the current memory ring 110 being empty, i.e., all hardware device IDs have been dequeued from the current memory ring 110. When this condition is detected by a processing core 120, the processing core 120 attempts to obtain a lock on the set of memory rings 109 (to prevent any other processing cores 120 from accessing the current memory ring 110 and next memory rings 112); and responsive to the given processing core 120 obtaining the lock, the processing core 120 proceeds with preparing the current memory ring 110 for the next epoch as follows.

Referring to FIG. 3 in conjunction with FIG. 1, as part of the preparation of the current memory ring 110 for the next epoch, the processing core 120 selects one or multiple delay orders (as further described herein) and dequeues, or removes, hardware device IDs from the next memory ring(s)

112 having the corresponding selected delay order(s), as depicted at reference numeral 304. In accordance with example implementations, the selection of the delay order(s) is controlled by an identifier, or epoch index (called "EPOCH ID" in FIG. 3). More specifically, in accordance with example implementations, the epochs are associated with a cyclical sequence of epochs; and the processing core 120 selects the next memory rings 112 based on an epoch index that indicates a particular position in the cyclical sequence.

For example, in accordance with some implementations, the delay orders are 0, 1, 2, 3 and 4; and the epochs are ordered in a repeating, or cyclic, sequence of sixteen epochs, i.e., a sequence of $2^{HIGHEST\ DELAY\ ORDER}$ (i.e., 2 to the power of the highest delay order value), or $2^4$ epochs. Therefore, for this set of delay orders, hardware devices that are associated with the delay order of "0" are polled in all sixteen epochs of the sequence. Hardware devices that are associated with the delay order of "1" are polled every other epoch of the sequence. Hardware devices that are associated with the delay order of "2" are polled every fourth epoch of the sequence of epochs. Hardware devices that are associated with the delay order of "3" are polled twice during the sequence, i.e., every eighth epoch. Hardware devices that are associated with the delay order of "4" are polled once every sequence of epochs.

In accordance with example implementations, the epoch index monotonically increases over time. For example, in accordance with some implementations, the epoch index may be an integer, and the integer may be incremented by one when the current epoch (indexed by a particular integer) transitions to the next epoch (indexed by the particular integer+1). As an example, for delay order values of 0, 1, 2, 3 and 4 (i.e., sixteen epochs per sequence), epoch indices 1, 17, 33, 65, 97 refer to the same epoch of the sequence of epochs; epoch indices 2, 18, 34, 66, 98 refer to the same epoch of the sequence of epochs; and so forth.

Still referring to FIG. 3, in accordance with example implementations, as part of the preparation of the current memory ring 110 for the next epoch, the processing core 120 may apply a mathematical operation, or function, to the epoch index corresponding to the next epoch to identify the delay orders that are associated with the next epoch; and based on the identified delay orders, the processor core 120 selects the corresponding next memory rings 112 from which the hardware device IDs are dequeued and then enqueued onto the current memory ring 110 to prepare the current memory ring 110 for the next epoch.

More specifically, in accordance with example implementations, a delay order N is associated with a particular epoch index if the following condition is satisfied:

$$\text{EPOCH\_ID MOD } 2^N = 0, \quad \text{Condition 1}$$

where "MOD" represents a modulo operator, which returns the remainder of the integer division of EPOCH_ID (i.e., the epoch index) divided by $2^N$ (2 to the power N). In other words, in accordance with example implementations, if an epoch index is evenly divisible by $2^N$, then the hardware devices that have IDs that are associated with the delay order N are polled in the epoch corresponding to the epoch index. It is noted that more than one delay order (i.e., more than one value for N) may satisfy Condition 1 for a particular epoch index.

The processing core 120 may, in accordance with example implementations, as part of the preparation of the current memory ring 110 for the next epoch, evaluate Condition 1 for multiple candidate delay orders to identify delays orders that are associated with the next epoch. Based on these evaluations, the processing core 120 may then dequeue the hardware device IDs from the next memory rings 112 that are associated with the identified delay orders (as depicted at reference numeral 304) and enqueue these hardware device IDs (as depicted at reference numeral 308) onto the current memory ring 110.

Figure 4:
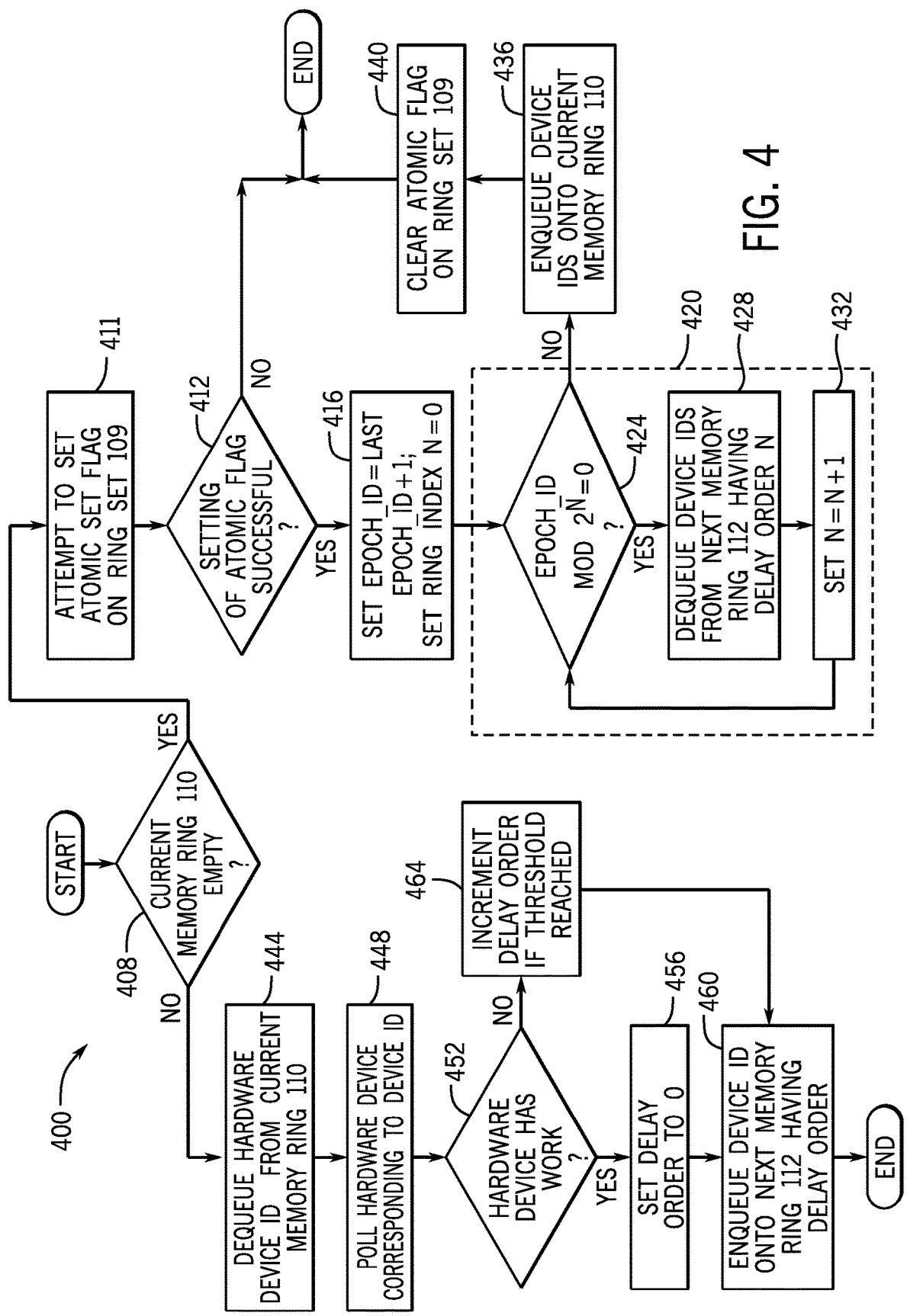
FIG. 4 is a flow diagram depicting a polling process of a processing core that uses a current memory ring and delay order-associated next memory rings according to an example implementation.

FIG. 4 depicts an example process 400 of the polling engine 154 (FIG. 1) in accordance with example implementations. In general, a processing core 120 may execute the process 400 to form an instance of the polling engine 154 and perform a polling cycle. Referring to FIG. 4 in conjunction with FIGS. 1 and 2, in accordance with example implementations, pursuant to decision block 408 of the process 400, the processing core 120 determines whether the current memory ring 110 is empty. If the current memory ring 110 is not empty, then the processing core 120 dequeues (block 444) a hardware device ID from the current memory ring 110 and polls the hardware device that corresponds to the hardware device ID, pursuant to block 448. The processing core 120 determines (decision block 452), as a result of the polling, whether the hardware device has work pending. If the hardware device has work pending, the processing core 120 sets (block 456) the associated delay order for the hardware device to zero and adds (block 460), or enqueues, the hardware device ID of the hardware device to the next memory ring 112-0; and at this point, the process 400 (and polling cycle) ends.

If the processing core 120 determines (decision block 452) that, as a result of the polling, that the hardware device does not have work pending, then, pursuant to block 464, the processor 464 increments the current delay order for the hardware device by one, in response to a consecutive number of "no work" responses from the hardware device reaching a no work threshold. In this manner, in accordance with some implementations, the processing cores 120 that share the memory ring set 109 may maintain and share a count of successive "no work" responses from hardware devices, such that if a particular hardware device has no work pending for a certain number of consecutive pollings, then the delay order of that hardware device is increased, resulting in a future lower frequency of pollings for the hardware device. In accordance with example implementations, a processing core 120, in response to determining that a particular hardware device has work pending, may clear, or reset, a count of successive "no work" responses for the device.

If the processing core 120 determines (decision block 408) that the current memory ring 110 is empty, then the processing core 120 attempts to set an atomic flag for the current memory ring 110. A set atomic flag serves as a lock to allow the processing core 120 acquiring the lock to prepare the ring set 109 for the next epoch. This preparation involves the processing core 120 dequeuing hardware device IDs from the next memory rings 109 of the ring set and enqueuing these hardware device IDs onto the current memory ring 110 of the ring set 109. Consequently, the lock prevents other processing cores 120 that share the ring set 109 from accessing the ring set 109 while the ring set 109 is being prepared for the next epoch.

If the processing core 120 determines (decision block 412) that the setting of the atomic flag is unsuccessful, then the process 400 terminates, as there are no more hardware devices to poll, and another processing core 120 is preparing the ring set 109 for the next epoch. If, however, the processing core 120 determines (decision block 412) that the setting of the atomic flag is successful, then this means the processing core 120 can proceed with preparing the ring set 109 for the next epoch. In this preparation, the processing core 120, pursuant to block 416, first increments the epoch index (called "EPOCH_ID" in FIG. 4) by one so that the epoch index references the next epoch; and the processing core 120 initializes a parameter called "ring index N" to have a value of zero. Next, the processing core 120 begins a subprocess 420 to identify and dequeue hardware device IDs from the appropriate next memory ring(s) 112, so that these hardware device IDs may then be enqueued (pursuant to block 436, after the subprocess 420 ends) onto the current memory ring 110.

The ring index N corresponds to a candidate delay order, and the subprocess 420 involves the processing core 120 evaluating Condition 1 for candidate delay orders for purposes of determining whether the candidate delay orders are associated the updated epoch index. More specifically, the processing core 120 evaluates (decision block 424) whether Condition 1 is satisfied for the current value of the ring index N. If Condition 1 is satisfied, then the processing core 120 dequeues, or removes, all of the hardware device IDs from the next memory ring 112 that corresponds to the current value of the ring index N; increments (block 432) the value of the ring index N by one; and returns to decision block 424.

In accordance with example implementations, Condition 1 is satisfied for a set of one or more initial successive values of the ring index N; and when the condition is not satisfied for a particular value of the ring index N, then Condition 1 will not be satisfied for any of the remaining value(s) of the ring index N. Stated differently, in accordance with example implementations, the subprocess 420 ends (and no more hardware devices IDs are dequeued from the next memory rings 112) in response to Condition 1 not being satisfied. This aspect of the subprocess 420 is illustrated in a table 500 of FIG. 5, which depicts the remainders of EPOCH_ID/$2^N$ for example consecutive epoch indices of 1, 2, 3 . . . 18, which correspond to rows 504 of the table 500. Columns 508 of the table 500 correspond to $2^N$ values of 1, 2, 4 and 16 for corresponding N values of 0, 1, 2, 3 and 4, respectively. The rows 504 that have the same number of zero(es) correspond to the same epoch of the sequence of epochs.

More specifically, as depicted in the first row 504 that corresponds to an epoch index of "1," the first entry (corresponding to N=0) is zero, and the other entries of the first row 504 are nonzero entries. This means that for the epoch index of "1," the hardware device IDs from the next memory ring 112-0 are dequeued, and then the subprocess 420 ends. In a similar manner, the subprocess 420 ends after identifying and dequeuing hardware device IDs from the next memory ring 112-0 for the other example odd epoch indices of 3, 5, 7, and so forth.

The second row 504 of the table 500 corresponds to an epoch index of "2," and the first two entries (corresponding to N=0 and N=1) of the second row 504 are zero, which means that the hardware device IDs from the next memory rings 112-0 and 112-1 are dequeued before the subprocess 420 ends. As depicted in the fourth row of table 500, which corresponds to an epoch index of "4," the first three entries (corresponding to N=0, N=1 and N=2) are zero, which means the hardware device IDs from the next memory rings 112-0, 112-1 and 112-2 are dequeued before the subprocess 420 ends. In a similar manner, due to the cyclic nature of the epochs, hardware device IDs from the next memory rings 112-0, 112-1 and 112-2 are dequeued every fourth epoch, i.e., epochs corresponding to the epoch indices of "8," "12," "16," and so forth.

The eighth row 504 of the table 500 corresponds to an epoch index of "8," and the first four entries (corresponding to N=0, N=1, N=2 and N=3) of the eighth row 504 are zero, which means the hardware device IDs from the next memory rings 112-0, 112-1, 112-2 and 112-3 are dequeued before the subprocess 420 ends. Correspondingly, due to the cyclic nature of the epochs, hardware device IDs from the next memory rings 112-0, 112-1, 112-2 and 112-3 are dequeued every eighth epoch, i.e., epoch indices of "16," "24," "32," and so forth.

As depicted in the sixteenth row 504 that corresponds to an epoch index of "16," the first five entries (corresponding to N=0, N=1, N=2, N=3 and N=4) are zero, which means the hardware device IDs from the next memory rings 112-0, 112-1, 112-2, 112-3 and 112-4 are dequeued before the subprocess 420 ends. In a similar manner, due to the cyclic nature of the epochs, hardware device IDs from the next memory rings 112-0, 112-1, 112-2, 112-3 and 112-4 are dequeued for every sixteenth epoch, i.e., epochs corresponding to epoch indices of "32," "48," "64," and so forth.

Still referring to FIG. 4, after the subprocess 420 has ended and the processing core 120 has dequeued a set of hardware device IDs from the next memory ring(s) 112, as depicted in block 436, the processing core 120 enqueues the dequeued hardware device IDs onto the current memory ring 110. At this point, the current memory ring 110 is prepared for the epoch corresponding to the EPOCH_ID index (i.e., the next epoch), and the processing core 120 clears (block 440) the atomic flag for the ring set 109 before the process 400 terminates.

In accordance with example implementations, one or more processing cores 120 may execute instructions, stored on at least one machine-readable storage medium, to perform polling cycles as described above in relation to FIGS. 1-5 and below in relation to FIGS. 8-10. In accordance with example implementations, processing cores 120 may execute instructions, stored on at least one machine-readable storage medium, to perform scheduled jobs for the applications 144 (see FIG. 1). In some examples, processing core(s) 120 may execute instructions, stored on at least one machine-readable storage medium, to balance processing time between polling and job execution using a throttling percentage, as described below in relation to FIGS. 6-7B, for example. In this context, a "throttling percentage" refers to a percentage, or share, of polling cycles that are skipped, or bypassed, by a processing core 120.

Figure 6:
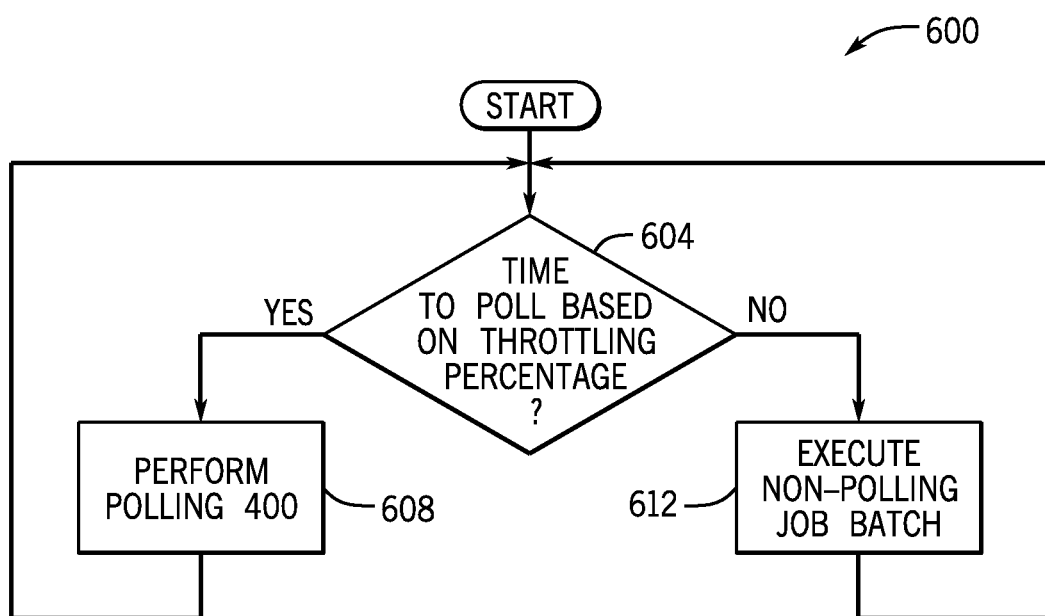
FIG. 6 is a flow diagram depicting a process of a processing core to regulate the polling of hardware devices based on a throttling percentage according to an example implementation.

More specifically, referring to FIG. 6 that depicts an example process 600 that may be performed by a processing core 120 executing instructions stored on at least one machine-readable storage medium. In the example process 600, processing core 120 may perform polling cycles, pursuant to block 608, and execute non-polling job batches, pursuant to block 612. More specifically, the processing core 120 may perform process 400 (FIG. 4) for a particular polling cycle, and, for a particular job cycle, the processing core 120 may retrieve a batch of several jobs (e.g., eight jobs) for one or multiple applications 144 from a job queue and execute the jobs.

For a throttling percentage of zero percent (i.e., no throttling), the processing core 120 executes a polling cycle for every job cycle (i.e., no polling cycles are bypassed). For a throttling percentage of 100 percent, the processing core 120 does not execute polling cycles (i.e., all polling cycles are bypassed). In accordance with example implementations, the throttling percentage is less than 100 percent, which means that the processing core 120 executes at least some polling cycles. As depicted in FIG. 6, the processing core 120 determines (decision block 604) based on a throttling percentage, whether a given polling cycle should be executed; and if so, the processing core 120 executes the polling cycle (block 608). Otherwise, if the processing core 120 determines (decision block 604), based on the throttling percentage, that the polling cycle should be bypassed, then the processing core 120 proceeds to execute another non-polling job batch, pursuant to block 612, before returning to decision block 604.

In accordance with example implementations, the processing core 120 determines its throttling percentage based on a measurement of an overall busy time of the processing core 120 and a measurement of the time that the processing core 120 spends polling. As described further herein, the processing core 120 determines a first degree of throttling (also called a "total utilization-based throttling parameter" herein) based on the measurement of the overall busy time (i.e., non-idle time) of the processing core 120, and the processing core 120 determines a second degree of throttling (also called a "polling utilization-based throttling parameter" herein) based on the measurement of the amount of the overall busy time that the processing core 120 spends polling.

In general, the first degree of throttling tends to be lower (corresponding to less throttling and more polling) when the processing core 120 has a relatively lighter workload and correspondingly has more idle time; and the first degree of throttling tends to be higher (corresponding to more throttling and less polling) when the processing core 120 has a relatively greater workload and correspondingly, less idle time.

The second degree of throttling, in general, tends to be lower (corresponding to less throttling and more polling) when the processing core 120 is spending relatively less time polling; and the second degree of throttling tends to be higher (corresponding to more throttling and less polling) when the processing core 120 is spending relatively more time polling.

In accordance with example implementations, the processing core 120 determines the throttling percentage based on the first degree of throttling and the second degree of throttling. As an example, in accordance with some implementations, the first and second degrees of throttling are percentages; and the processing core 120 sets its throttling percentage to be the greater of the two percentages. Consequently, in accordance with example implementations, the measurements of the overall busy time and polling time produce corresponding throttling recommendations (i.e., the first and second degrees of throttling), and the processing core 120 selects the recommendation of the highest degree of throttling.

More specifically, in accordance with example implementations, the measurement of the overall busy time of the processing core 120 is a past, or historical, measurement of the total utilization of the processing core 120, and based on the total utilization measurement, the processing core 120 determines a total utilization-based throttling parameter, which represents a share (or a percentage) of polling cycles to bypass. In this context, the "total utilization" refers to a measure of the total busy time of the processing core 120, i.e., a measure of the time spent by the processing core 120 when not idle, or stated differently, a measure of the total time spent by the processing core 120 executing instructions in both the user mode and the kernel mode.

In accordance with some implementations, the total utilization may be a percentage of non-idle time of the processing core 120 measured over a measurement window of time. As an example, the processing core 120 may obtain these measurements using operating system calls. The measurement window of time may be a time contiguous "sliding time window" that corresponds to a time interval of a certain duration (e.g., 1.5 wall clock seconds) and has an end time that corresponds to a time at or near the time when the processing core 120 performs the total utilization measurement. Therefore, in accordance with example implementations, the total utilization measurement is a moving average of the total utilization of the processing core 120. The total utilization-based throttling parameter, in accordance with example implementations, tends to be higher (corresponding to more throttling and less polling) for relatively higher total utilizations, and the total utilization-based throttling parameter tends to be lower (corresponding to less throttling and more polling) for relatively lower total utilizations.

In accordance with example implementations, the measurement of the time spent by the processing core 120 polling is a past, or historical, measurement of a polling utilization measurement, and based on the polling utilization measurement, the processing core 120 determines a polling utilization-based throttling parameter, which represents a share (or a percentage) of polling cycles to bypass. In this context, the "polling utilization" refers to a measure of the share of the total busy time (i.e., non-idle time) of the processing core 120, which the processing core 120 spends polling. In accordance with some implementations, the polling utilization may be a percentage of polling time measured over the same sliding time window that is used to measure the total utilization.

Therefore, in accordance with example implementations, the polling utilization measurement is a moving average of the polling utilization. In accordance with example implementations, the processing core 120 may measure the polling utilization using operating system calls. The polling utilization-based throttling parameter, in accordance with example implementations, tends to be higher (corresponding to more throttling and less polling) for relatively higher polling utilizations, and the polling utilization-based throttling parameter tends to be lower (corresponding to less throttling and more polling) for relatively lower polling utilizations.

In accordance with some implementations, the processing core 120 maintains moving averages of the total utilization and polling utilization and updates the moving averages regularly, such as, for example, on a periodic basis (e.g., in response to periodic interrupts) or pursuant to another schedule. Moreover, in accordance with example implementations, each time the processing core 120 updates its total utilization and polling utilization averages based on the new samples of overall busy time and polling time, the processing core 120 re-calculates its throttling percentage based on the updated moving average values.

The processing core 120 may set on upper limit and/or a lower limit on the throttling percentage. For example, in accordance with some implementations, the processing core 120 may set a maximum allowable throttling percentage of 90 percent (i.e., at least ten percent of polling cycles are executed, even for a processing core 120 having a high total utilization and/or high polling utilization), and the processing core 120 may allow the throttling percentage to decrease to zero percent (effectively corresponding to a minimum allowable throttling percentage of zero percent).

In accordance with further implementations, the maximum allowable throttling percentage may be 100 percent, the maximum allowable throttling percentage may be a percentage other than 90 or 100 percent, the minimum allowable throttling percentage may be a percentage other than zero percent, and so forth.

In accordance with some implementations, the processing core 120 may impose the maximum allowable throttling percentage and minimum allowable throttling percentage in the calculations of the total utilization-based throttling parameter and the polling utilization-based throttling parameter, as further described herein.

Figure 7A:
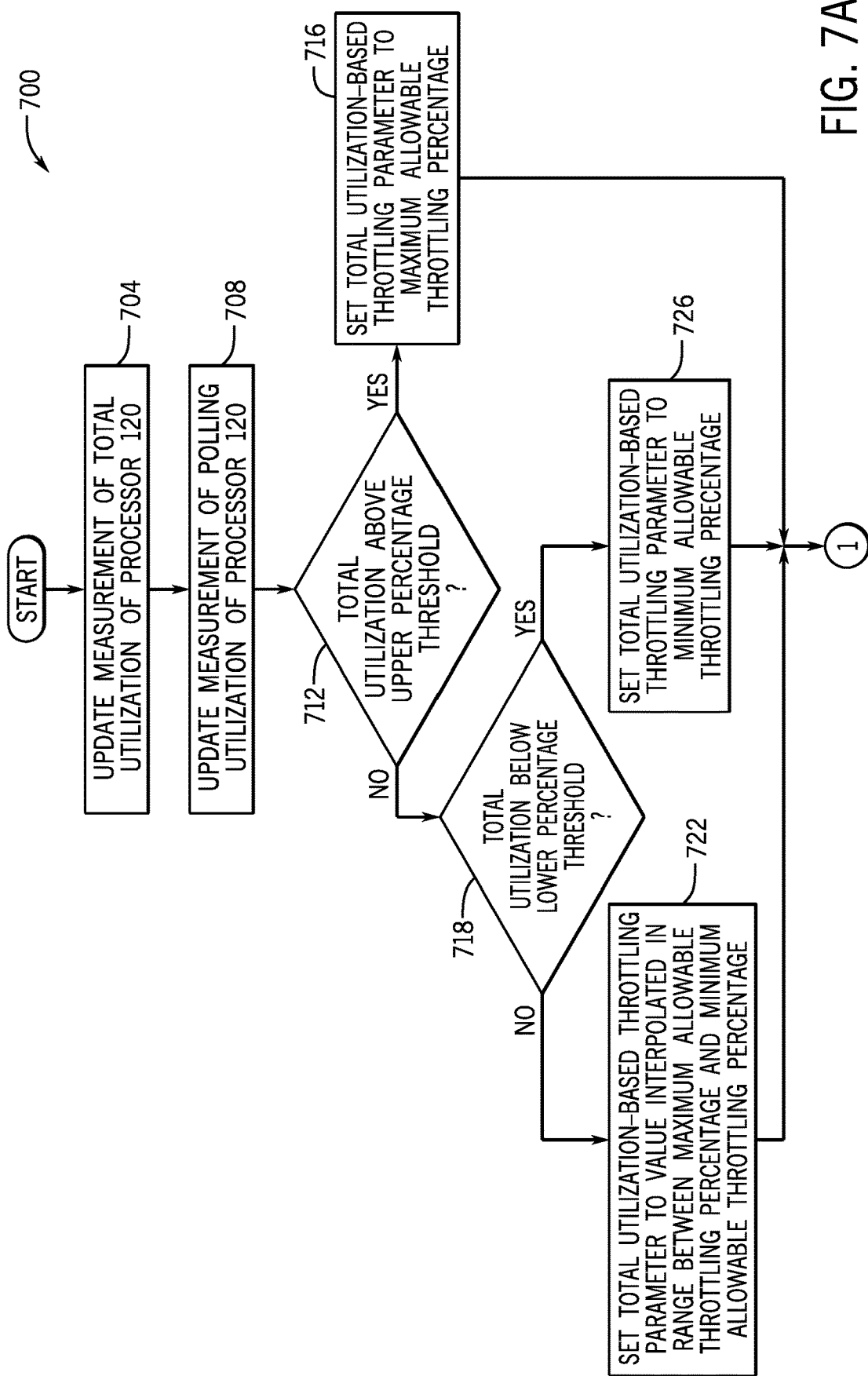
FIGS. 7A and 7B are flow diagrams depicting a process of a processing core to determine a polling throttling percentage based on a core total utilization-based throttling parameter and a core polling utilization-based throttling parameter according to an example implementation.
Figure 7B:
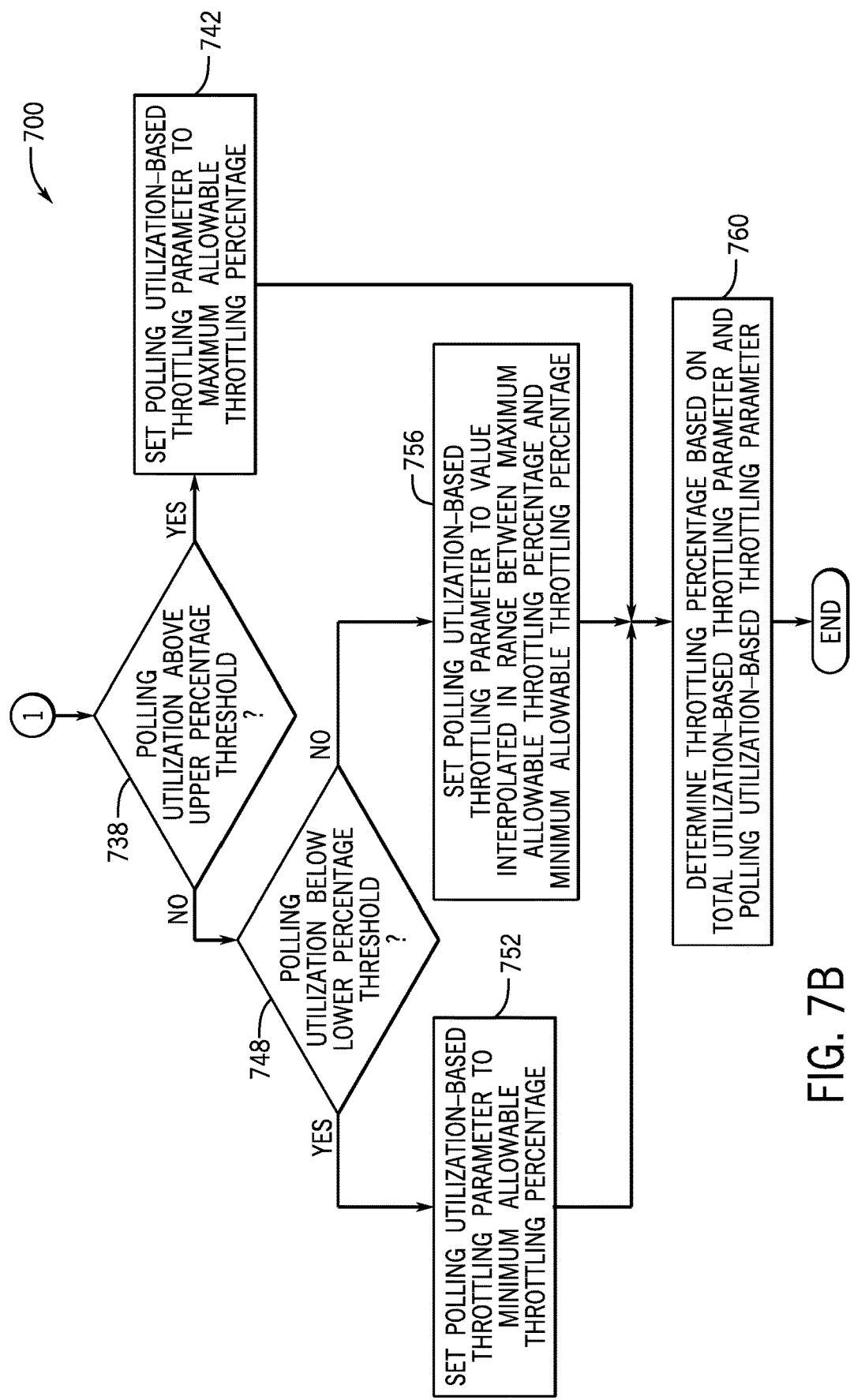

FIGS. 7A and 7B depict an example process 700 that may be performed by a processing core 120 executing instructions stored on at least one machine-readable storage medium. In the example process 700, the processing core 120 may to calculate, or determine, the throttling percentage, in accordance with example implementations. Referring to FIG. 7A in conjunction with FIG. 1, pursuant to the process 700, the processing core 120 updates (block 704) a moving average of the total utilization of the processing core 120 over the most recent time window (e.g., the last 1.5 wall clock seconds) and updates (block 708) a moving average of the polling utilization of the processing core 120 over the most recent time window.

Next, pursuant to the process 700, the processing core 120 determines a total utilization-based throttling parameter based on the measured total utilization. In determining this parameter, the processing core 120 may apply two watermarks, or thresholds: an upper percentage threshold and a lower percentage threshold. The processing core 120 compares (decision block 712) the measured total utilization to the upper percentage threshold to determine whether the measured total utilization is above the upper percentage threshold, and the processing core 120 compares (decision block 718) the measured total utilization to the low percentage threshold to determine whether the measured total utilization is below the lower percentage threshold. If the measured total utilization is above the upper percentage threshold, then the processing core 120 sets the total utilization-based throttling parameter to the maximum allowable throttling percentage, pursuant to block 716. If the measured total utilization is below the lower percentage threshold, then the processing core 120 sets the total utilization-based throttling parameter to the minimum allowable throttling percentage, pursuant to block 726.

If the measured total utilization is between the upper and lower percentage thresholds (i.e., both "No" prongs of decision blocks 712 and 718 are satisfied), then the processing core 120 may, in accordance with example implementations, set (block 722) the total utilization-based throttling parameter to a value that is interpolated in a range between the maximum allowable throttling percentage and the minimum allowable throttling percentage. The interpolation may be a linear interpolation based on the position of the total utilization between the upper percentage threshold and the lower percentage threshold.

As an example of this interpolation, the maximum allowable throttling percentage may be 90 percent, the minimum allowable throttling percentage may be zero percent, the lower percentage threshold may be 65 percent, the upper percentage threshold may be 95 percent, and the total utilization may be 75 percent. A first range between the lower and upper percentage thresholds spans thirty percentage points, and a second range between the maximum and minimum allowable throttling thresholds spans 90 percentage points. The 75 percent total utilization corresponds to one third fourth of the first range, which means that the interpolated value for the utilization-based throttling percentage corresponds to one third of the second range, or an interpolated value of 30 percent. The processing core 120 may use an interpolation other than linear interpolation, in accordance with further implementations.

Referring to FIG. 7B in conjunction with FIG. 1, the processing core 120 may calculate the polling utilization-based throttling parameter as follows, in accordance with example implementations. Similar to the calculation of the total utilization-based throttling parameter, the processing core 120 may compare the measured polling utilization to two watermarks, or thresholds: an upper percentage threshold and a lower percentage threshold. These percentage thresholds may be different than the thresholds used to calculate the total utilization-based throttling parameter.

If the processing core 120 determines (decision block 738) that the measured polling utilization is above the upper percentage threshold, then the processing core 120 sets (block 742) the polling utilization-based throttling parameter to the maximum allowable throttling percentage. If the processing core 120 determines (decision block 748) that the measured total utilization is below the lower percentage threshold, then the processing core 120 sets (block 752) the polling utilization-based throttling parameter to the minimum allowable throttling percentage (or sets the utilization-based throttling parameter to zero percent, if no minimum allowable throttling percentage).

If the measured polling utilization is between the upper and lower percentage thresholds (i.e., both "No" prongs of decision blocks 738 and 748 are satisfied), then the processing core 120 may, pursuant to block 756, interpolate a value for the polling utilization-based throttling parameter in a range between the minimum allowable throttling percentage and the maximum allowable throttling percentage. The interpolation may be a linear interpolation based on the position of the measured polling utilization between the upper percentage threshold and the lower percentage threshold, similar to the interpolation discussed above for the calculation of the total utilization-based throttling parameter. The processing core 120 may use nonlinear interpolation to determine the interpolated value, in accordance with further example implementations.

Pursuant to block 760, the processing core 120 determines the throttling percentage based on the total utilization-based throttling parameter and the polling utilization-based throttling parameter. In accordance with example implementations, the processing core 120 may select the maximum of the two throttling parameters and set the throttling percentage to the selected maximum.

As an example of the processor's determination of the throttling percentage, the maximum allowable throttling percentage may be 90 percent, the minimum allowable throttling percentage may be zero percent, the measured total utilization may be 70 percent, and the measured polling utilization may be 20 percent. For the calculation of the total utilization-based throttling parameter, the processing core 120 uses an upper percentage threshold of 95 percent and a lower percentage threshold of 75 percent. Because the measured total utilization is less than the lower percentage threshold of 75 percent, the processing core 120 sets the utilization-based throttling parameter to the minimum allowable throttling parameter, or zero percent.

For the calculation of the polling utilization-based throttling parameter, the processing core 120 uses an upper percentage threshold of 30 percent and a lower percentage threshold of 10 percent. Because the measured polling utilization of 20 percent is midway between the upper and lower percentage thresholds, the processing core 120 sets the polling utilization-based throttling parameter to the midway point between zero percent (the minimum allowable throttling percentage) and 90 percent (the maximum allowable throttling percent), or 45 percent. Therefore, for this example, the processing core 120 determines the total utilization throttling parameter to be zero percent, and the processing core 120 determines the polling utilization-based throttling parameter to be 45 percent; and the processing core 120 sets the throttling percentage to be the higher of the two parameters, or 45 percent.

Figure 8:
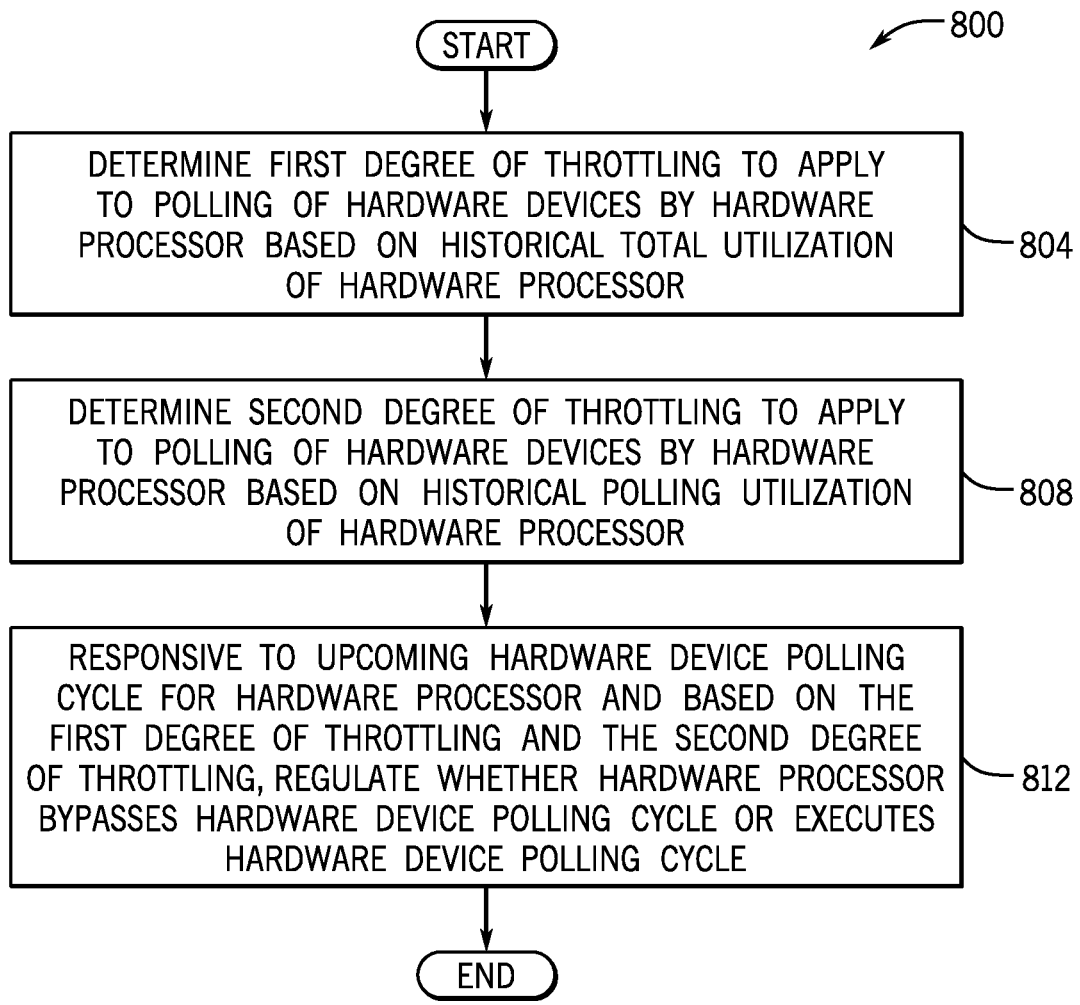
FIG. 8 is a flow diagram depicting a process to regulate whether a hardware processor bypasses or executes a hardware device polling cycle based on historical total and polling utilizations of the processor according to an example implementation.

Referring to FIG. 8, in accordance with example implementations, an example process 800 may be performed by one or more processing cores 120 executing instructions that are stored on at least one machine-readable storage medium. The example process 800 includes determining (block 804) a first degree of throttling to apply to a polling of hardware devices by a hardware processor based on a historical total utilization of the hardware processor; and determining (block 808) a second degree of throttling to apply to the polling of hardware devices by the hardware processor based on a historical polling utilization of the hardware processor. The process 800 includes, responsive to an upcoming hardware device polling cycle for the hardware processor, and based on the first degree of throttling and the second degree of throttling, regulating (block 812) whether the hardware processor bypasses the hardware device polling cycle or executes the hardware device polling cycle.

Figure 9:
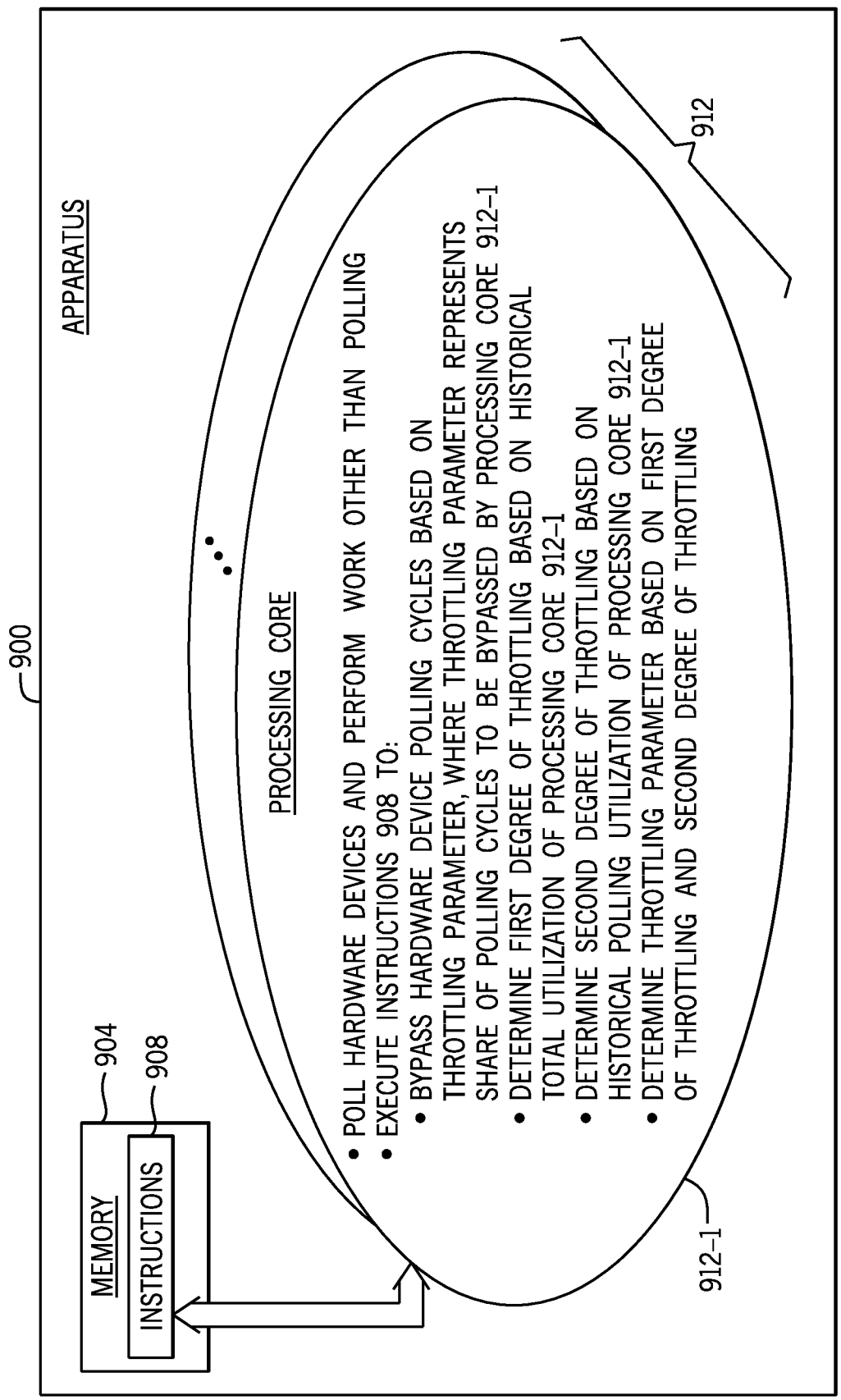
FIG. 9 is a schematic diagram of an apparatus that includes a processing core to execute instructions to bypass hardware device polling cycles based on a throttling parameter derived from historical total and polling utilizations of the processing core according to an example implementation.

Referring to FIG. 9, in accordance with example implementations, an apparatus 900 includes a memory 904; and a plurality of processing cores 912. The memory 904 stores instructions 908 to perform the functions described herein in relation to FIG. 9. The plurality of processing cores 912 poll hardware devices and perform work other than polling. The plurality of processing cores 912 includes a given processing core 912-1. The given processing core 912-1 executes the instructions 908 to bypass hardware device polling cycles based on a throttling parameter. The throttling parameter represents a share of polling cycles to be bypassed by the given processing core 912-1. The given processing core 912-1 determines a first degree of throttling based on a historical total utilization of the given processing core 912-1; determines a second degree of throttling based on a historical polling utilization of the given processing core 912-1; and determines the throttling parameter based on the first degree of throttling and the second degree of throttling.

Figure 10:
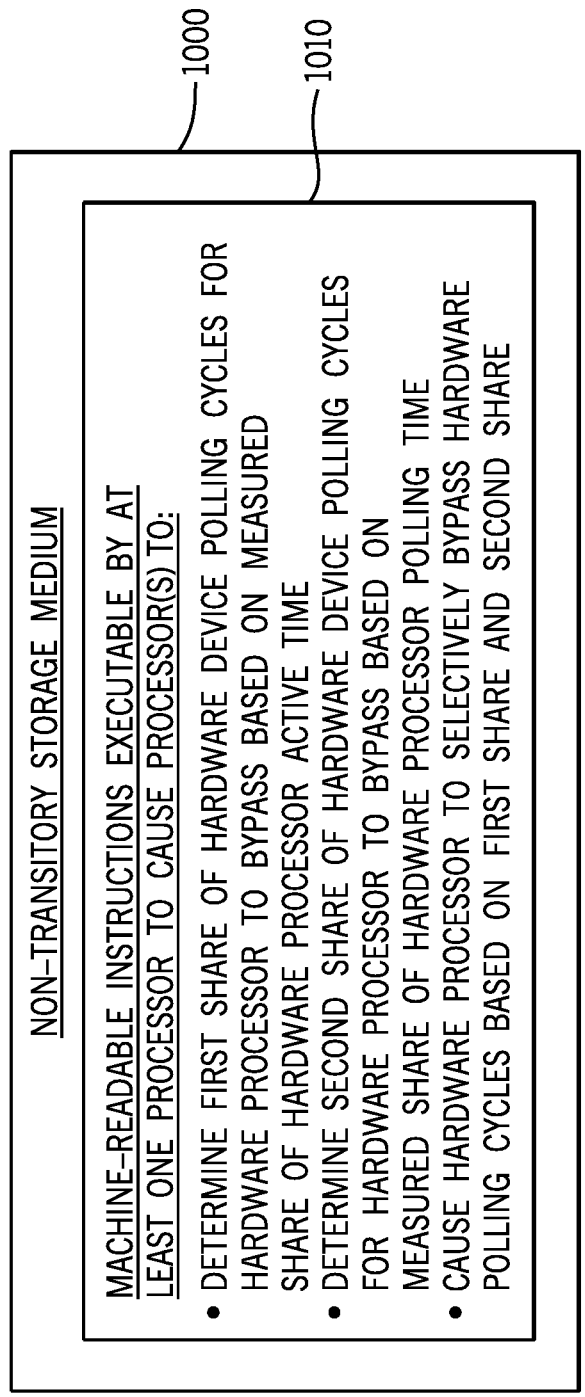
FIG. 10 is an illustration of a non-transitory storage medium storing machine-readable instructions that, when executed by at least one processor, cause the processor(s) to selectively bypass hardware polling cycles based on measured shares of active hardware processor time and hardware device polling time according to an example implementation.

Referring to FIG. 10, in accordance with example implementations, a non-transitory storage medium 1000 stores machine-readable instructions 1010 that, when executed by at least one processor, cause the processor(s) to determine a first share of hardware device polling cycles for a hardware processor to bypass based on a measured share of hardware processor active time. The instructions 1010, when executed by the processor(s), further cause the processor(s) to determine a second share of the hardware device polling cycles for the hardware processor to bypass based on a measured share of hardware processor polling time. The instructions 1010, when executed by the processor(s), further cause the processor(s) to cause the hardware processor to selectively bypass the hardware polling cycles based on the first share and the second share.

In accordance with example implementations, the historical total utilization includes a percentage of time that the hardware processor is active in reference to a total time that the hardware processor is active and idle. The historical polling utilization includes a percentage of time that the hardware processor is performing polling operations in reference to the total time that the hardware processor is active. A particular advantage is that throttling of polling cycles may be performed based on measured processor performance.

In accordance with example implementations, the hardware processor determines a first cumulative time that the hardware processor is active over a first time window, and the hardware processor determines a first percentage representing the historical total utilization based on the first cumulative time and a duration of the first time window. Moreover, the hardware processor determines a second cumulative time that the hardware processor is performing polling over a second time window, and the hardware processor determines a second percentage representing the historical polling utilization based on the second cumulative time and a duration of the second time window. A particular advantage is that throttling of polling cycles may be performed based on measured processor performance.

In accordance with example implementations, the hardware processor moves time boundaries of the first time window for repeated determinations of the first percentage, and the hardware processor moves time boundaries of the second time window to repeatedly determine the second percentage. A particular advantage is that moving averages may be used to update throttling control for polling cycles based on the most recent measured statistics for the hardware processor.

In accordance with example implementations, the hardware processor repeatedly updates the historical total utilization over time; the hardware processor repeatedly updates the historical polling utilization over time; and responsive to the repeated updating of the historical total utilization and the repeated updating of the historical polling utilization, the hardware processor repeatedly determines the first degree of throttling, and repeatedly determines the second degree of throttling. A particular advantage is that moving averages may be used to update throttling control for polling cycles based on the most recent measured statistics for the hardware processor.

In accordance with example implementations, determining the first degree of throttling includes the hardware processor comparing the historical total utilization to a predetermined total utilization low threshold and a predetermined total utilization high threshold larger than the predetermined total utilization low threshold; and the hardware processor determining the first degree of throttling based on a result of the comparison. A particular advantage is that a throttling percentage based on historical total utilization may be adjusted using thresholds, or watermarks, for purposes of biasing the throttling regulation such that the hardware processor performs more polling when underutilized and performs less polling when overutilized.

In accordance with example implementations, the comparison includes the hardware processor determining that the historical total utilization is below the predetermined total utilization low threshold; and the hardware processor determining the first degree of throttling further includes the hardware processor setting the first degree of throttling to a number representing a predetermined minimum amount of throttling. A particular advantage is that a total utilization-based throttling may be regulated to increase the throttling for an underutilized hardware processor.

In accordance with example implementations, the comparing includes the hardware processor determining that the historical total utilization is above the predetermined total utilization high threshold; and the hardware processor determining that the first degree of throttling further includes the hardware processor setting the first degree of throttling to a number representing a predetermined maximum degree of throttling. A particular advantage is that throttling regulation based on processor total utilization may be controlled to bias the throttling to maximize the throttling for an overutilized hardware processor.

In accordance with example implementations, the hardware processor determines that the historical polling utilization is below a predetermined polling utilization low threshold; and the hardware processor determines the second degree of throttling includes the hardware processor setting the second degree of throttling to a number representing a predetermined minimum degree of throttling. A particular advantage is that a bias may be built into the throttling regulation to increase polling for a hardware processor that is underutilized for polling.

In accordance with example implementations, the hardware processor determines that the historical polling utilization is above a predetermined polling utilization high threshold; and the hardware processor determining the second degree of throttling further includes the hardware processor setting the second degree of throttling to a number representing a predetermined maximum degree of throttling. A particular advantage is that the throttling regulation may have a bias to reduce the amount of polling utilization of a hardware processor when the hardware processor is being overutilized for polling.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
    determining a first degree of throttling to apply to a polling of hardware devices by a hardware processor based on a historical total utilization of the hardware processor;
    determining a second degree of throttling to apply to the polling of hardware devices by the hardware processor based on a historical polling utilization of the hardware processor; and
    providing a software stack to allow applications to access the hardware devices, wherein providing the software stack comprises:
        responsive to an upcoming hardware device polling cycle for the hardware processor, and based on the first degree of throttling and the second degree of throttling, regulating whether the hardware processor bypasses the hardware device polling cycle or executes the hardware device polling cycle.

2. The method of claim 1, wherein the historical total utilization comprises a percentage of time that the hardware processor is active referenced to a total time that the hardware processor is active and idle, and the historical polling utilization comprises a percentage of time that the hardware processor is performing polling operations referenced to the total time that the hardware processor is active.

3. The method of claim 1, further comprising:
    the hardware processor determining a first cumulative time that the hardware processor is active over a first time window, and the hardware processor determining a first percentage representing the historical total utilization based on the first cumulative time and a duration of the first time window; and
    the hardware processor determining a second cumulative time that the hardware processor is performing polling over a second time window, and the hardware processor determining a second percentage representing the historical polling utilization based on the second cumulative time and a duration of the second time window.

4. The method of claim 3, further comprising:
    the hardware processor moving time boundaries of the first time window for repeated determinations of the first percentage; and
    the hardware processor moving time boundaries of the second time window to repeatedly determine the second percentage.

5. The method of claim 1, further comprising:
    the hardware processor repeatedly updating the historical total utilization over time;
    the hardware processor repeatedly updating the historical polling utilization over time; and
    responsive to the repeated updating of the historical total utilization and the repeated updating of the historical polling utilization, the hardware processor repeatedly determining the first degree of throttling, and repeatedly determining the second degree of throttling.

6. The method of claim 1, wherein determining the first degree of throttling comprises:
    the hardware processor comparing the historical total utilization to a predetermined total utilization low threshold and a predetermined total utilization high threshold larger than the predetermined total utilization low threshold; and
    the hardware processor determining the first degree of throttling based on a result of the comparison.

7. The method of claim 6, wherein:
    the comparing comprises the hardware processor determining that the historical total utilization is below the predetermined total utilization low threshold; and
    the hardware processor determining the first degree of throttling further comprises the hardware processor setting the first degree of throttling to a number representing a minimum amount of throttling.

8. The method of claim 6, wherein:
    the comparing comprises the hardware processor determining that the historical total utilization is above the predetermined total utilization high threshold; and
    the hardware processor determining the first degree of throttling further comprises the hardware processor setting the first degree of throttling to a number representing a predetermined maximum degree of throttling.

9. The method of claim 6, wherein:
    the comparing comprises the hardware processor determining that the historical total utilization is between the predetermined total utilization low threshold and the predetermined total utilization high threshold; and
    the hardware processor determining the first degree of throttling further comprises the hardware processor, based on a location of the historical total utilization in a first range between the predetermined total utilization low threshold and the predetermined total utilization high threshold, interpolating a number representing the first degree of throttling within a second range of numbers extending from a first number representing no throttling to a second number representing a predetermined maximum degree of throttling.

10. The method of claim 1, wherein determining the second degree of throttling comprises:
    the hardware processor comparing the historical polling utilization to a predetermined polling utilization low threshold and a predetermined polling utilization high threshold larger than the predetermined polling utilization low threshold; and the hardware processor determining the second degree of throttling based on a result of the comparison.

11. The method of claim 10, wherein:

the comparing comprises the hardware processor determining that the historical polling utilization is below the predetermined polling utilization low threshold; and the hardware processor determining the second degree of throttling further comprises the hardware processor setting the second degree of throttling to a number representing a predetermined minimum degree of throttling.

12. The method of claim 10, wherein:

the comparing comprises the hardware processor determining that the historical polling utilization is above the predetermined polling utilization high threshold; and the hardware processor determining the second degree of throttling further comprises the hardware processor setting the second degree of throttling to a number representing a predetermined maximum degree of throttling.

13. The method of claim 10, wherein:

the comparing comprises the hardware processor determining that the historical polling utilization is between the predetermined polling utilization low threshold and the predetermined polling utilization high threshold; and the hardware processor determining the second degree of throttling further comprises the hardware processor, based on a location of the historical polling utilization in a first range between the predetermined polling utilization low threshold and the predetermined polling utilization high threshold interpolating a number representing the first degree of throttling within a second range of numbers extending from a first number representing no throttling to a second number representing a predetermined maximum degree of throttling.

14. The method of claim 1, wherein:

the first degree of throttling comprises a first value that is larger for relatively more throttling and is lower for relatively less throttling;

the second degree of throttling comprises a second value that is larger for relatively more throttling and is lower for relatively less throttling; and regulating whether the hardware processor bypasses the hardware device polling cycle or executes the hardware device polling cycle based on the first degree of throttling and the second degree of throttling comprises the hardware processor selecting the larger of the first value and the second value.

15. An apparatus comprising:

a memory to store instructions;

a plurality of processing cores to poll hardware devices and perform work other than polling, wherein the plurality of processing cores comprises a given processing core, and the given processing core to execute the instructions to:

bypass hardware device polling cycles based on a throttling parameter, wherein the throttling parameter represents a share of polling cycles to be bypassed by the given processing core;

determine a first degree of throttling based on a historical total utilization of the given processing core;

determine a second degree of throttling based on a historical polling utilization of the given processing core; and provide a software stack to allow applications to access the hardware devices, wherein the instructions to provide the software stack comprise instructions to:

determine the throttling parameter based on the first degree of throttling and the second degree of throttling.

16. The apparatus of claim 15, wherein the apparatus comprises a plurality of non-uniform memory architecture (NUMA) nodes, and a given NUMA node of the plurality of NUMA nodes comprise the plurality of processing cores.

17. The apparatus of claim 15, wherein the execution of the instructions further causes the processor to repeatedly:

determine a first cumulative time that the given processing core is active over a sliding time window;

determine a first percentage representing the historical total utilization based on the first cumulative time and a duration of the sliding time window;

determine a second cumulative time that the given processing core is performing polling over the sliding time window; and determine a second percentage representing the historical polling utilization based on the second cumulative time and the duration of the sliding time window.

18. A non-transitory storage medium that stores machine-readable instructions that, when executed by at least one processor, cause the at least one processor to:

determine a first share of hardware device polling cycles for a hardware processor to bypass based on a measured share of hardware processor active time;

determine a second share of the hardware device polling cycles for the hardware processor to bypass based on a measured share of hardware processor polling time; and provide a software stack to allow applications to access hardware devices, wherein the instructions to provide the software stack comprise instructions to:

cause the hardware processor to selectively bypass the hardware device polling cycles based on the first share and the second share.

19. The storage medium of claim 18, wherein the instructions, when executed by the at least one processor, further cause the at least one processor to:

cause the hardware processor to compare the historical total utilization to a predetermined total utilization low threshold and a predetermined total utilization high threshold larger than the predetermined total utilization low threshold;

cause the hardware processor to determine the first share based on the comparison of the historical total utilization to the predetermined total utilization low threshold, and the predetermined total utilization high threshold;

cause the hardware processor to compare the historical polling utilization to a predetermined polling utilization low threshold and a predetermined polling utilization high threshold larger than the predetermined polling utilization low threshold; and cause the hardware processor to determine the second share based on a result of the comparison of the historical polling utilization to the predetermined polling utilization low threshold and the predetermined polling utilization high threshold.

20. The storage medium of claim 19, wherein:
the first share comprises a first value that is larger for relatively more throttling and lower for relatively less throttling;
the second share comprises a second value that is larger for relatively more throttling and lower for relatively less throttling; and
the instructions, when executed by the at least one processor, further cause the at least one processor to select the larger of the first value and the second value to determine a throttling parameter, and cause the hardware processor to selectively bypass the hardware polling cycles based on the throttling parameter.

\* \* \* \* \*